United States Patent
Dionne

(10) Patent No.: US 10,823,041 B2
(45) Date of Patent: Nov. 3, 2020

(54) ENGINE ASSEMBLY WITH PLENUM AND REMOTE FAN

(71) Applicant: PRATT & WHITNEY CANADA CORP., Longueuil (CA)

(72) Inventor: Luc Dionne, Candiac (CA)

(73) Assignee: PRATT & WHITNEY CANADA CORP., Longueuil, QC (CA)

(*) Notice: Subject to any disclaimer, the term of this patent is extended or adjusted under 35 U.S.C. 154(b) by 276 days.

(21) Appl. No.: 15/846,652

(22) Filed: Dec. 19, 2017

(65) Prior Publication Data

US 2019/0186334 A1 Jun. 20, 2019

(51) Int. Cl.
| | |
|---|---|
| *F01P 5/06* | (2006.01) |
| *F02B 41/10* | (2006.01) |
| *F01P 3/20* | (2006.01) |
| *F01P 3/18* | (2006.01) |
| *B64D 27/04* | (2006.01) |
| *B64C 27/82* | (2006.01) |

(52) U.S. Cl.
CPC ............ *F01P 5/06* (2013.01); *B64C 27/82* (2013.01); *B64D 27/04* (2013.01); *F01P 3/18* (2013.01); *F01P 3/20* (2013.01); *F02B 41/10* (2013.01); *F01P 2050/20* (2013.01); *F01P 2060/04* (2013.01)

(58) Field of Classification Search
CPC ........ F01P 5/06; F01P 3/20; F01P 3/18; F01P 2050/20; F02B 41/10; B64C 27/82; B64D 27/04

See application file for complete search history.

(56) References Cited

U.S. PATENT DOCUMENTS

| 4,830,312 A * | 5/1989 | Hain ................... B64D 33/08 244/17.11 |
| 4,999,994 A * | 3/1991 | Ru/ d ..................... F02C 7/047 416/170 R |
| 6,704,630 B2 | 3/2004 | Ostrom et al. |
| 9,328,650 B2 | 5/2016 | Reynolds et al. |
| 9,932,906 B2 | 4/2018 | Xiong et al. |
| 2008/0053101 A1* | 3/2008 | Schwarz ............... B64D 33/02 60/772 |
| 2016/0376023 A1* | 12/2016 | Ullyott .................... F02C 3/10 290/52 |
| 2016/0376981 A1* | 12/2016 | Ullyott ................. F01C 11/008 60/607 |
| 2017/0037776 A1 | 2/2017 | Jones et al. |
| 2017/0267341 A1* | 9/2017 | Thomassin ............ B64C 21/04 |

OTHER PUBLICATIONS

Teos Powertrain Engineering, Jet A-1 aircraft engine, www.teos-enigneering/experience/jet-a1-aircraft-engine/, May 4, 2017.

* cited by examiner

*Primary Examiner* — Audrey K Bradley
(74) *Attorney, Agent, or Firm* — Norton Rose Fulbright Canada LLP

(57) ABSTRACT

An aircraft engine assembly having a turbo-compounded internal combustion engine having an engine shaft. A coolant cooler is fluidly connected to a coolant circuitry of the internal combustion engine and to the environment. A plenum is connected with the environment via the coolant cooler and via an air outlet. A fan is disposed adjacent the air outlet and is operable to drive an airflow from the environment into the plenum via the coolant cooler. The fan is spaced apart from the internal combustion engine in a direction perpendicular to the engine shaft. A method of defining a cooling air circulation is also discussed.

19 Claims, 5 Drawing Sheets

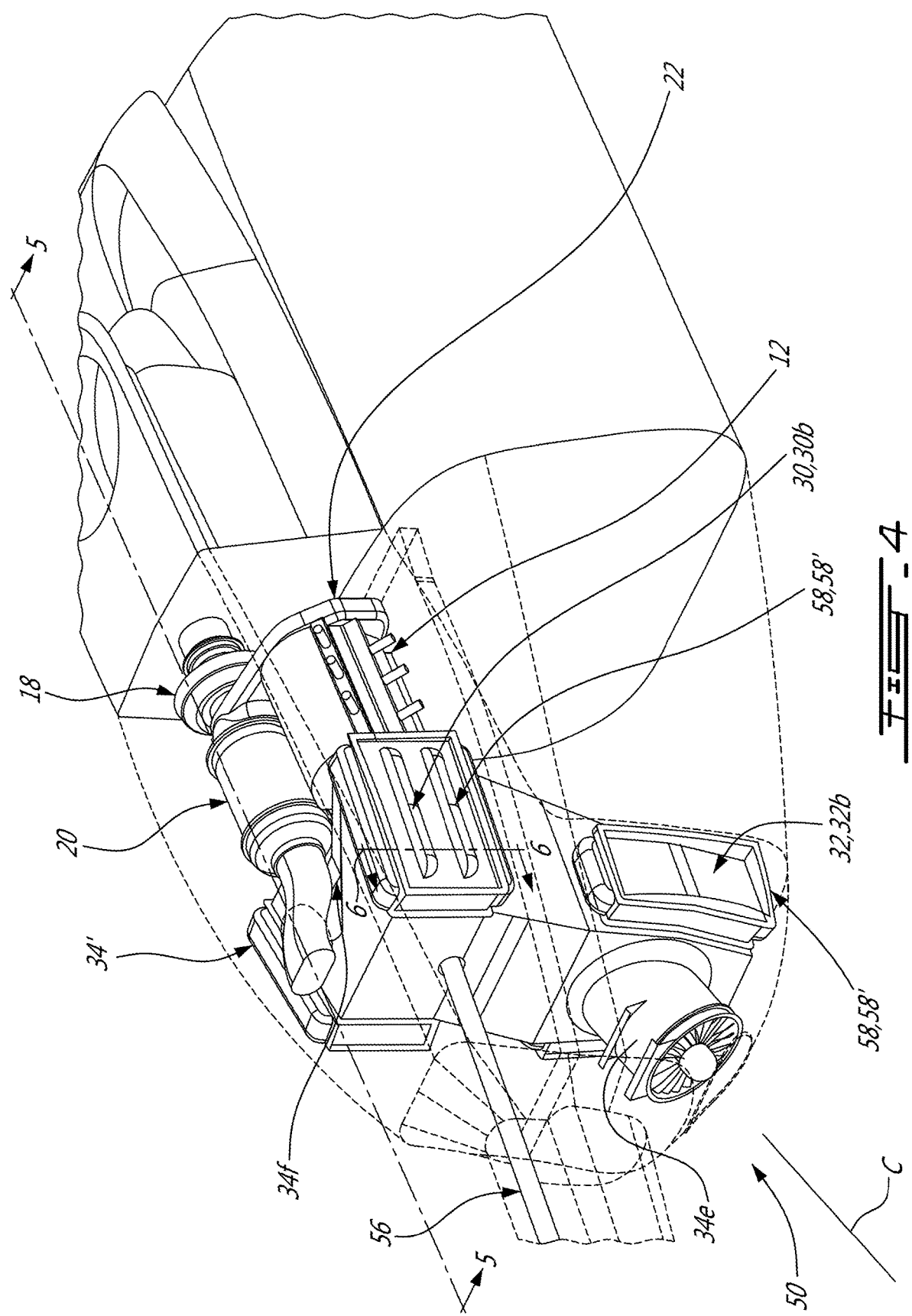

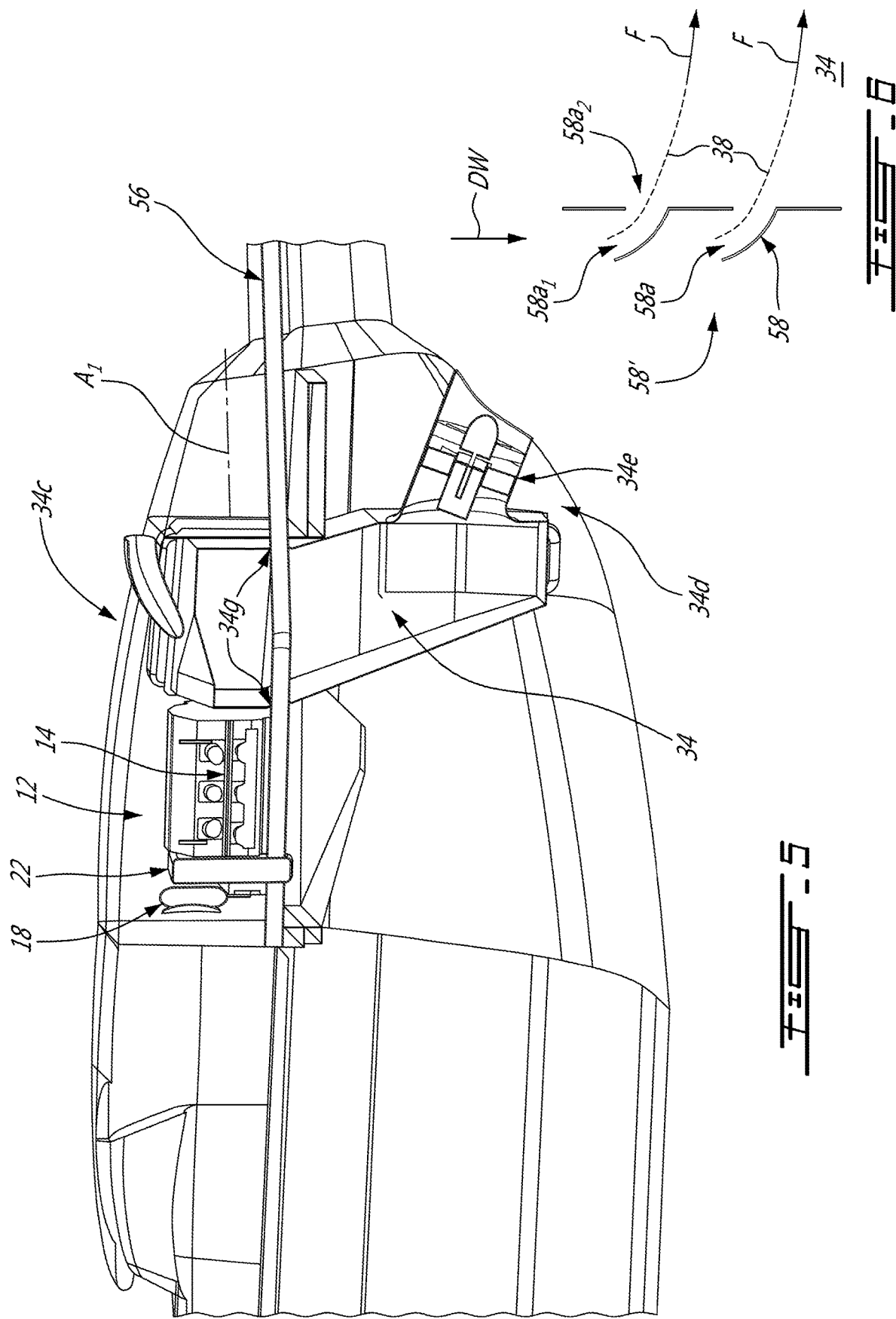

US 10,823,041 B2

ENGINE ASSEMBLY WITH PLENUM AND REMOTE FAN

TECHNICAL FIELD

The application relates generally to engine assemblies with internal combustion engines and, more particularly, to systems and methods used to cool such engines.

BACKGROUND OF THE ART

In some aircraft, for example helicopters, space may be limited for the installation of one or more engine(s). Liquid-cooled internal combustion engines typically require a cooler to cool the liquid coolant of the engine(s), as well as a blower or other forced air system to drive a cooling airflow through the cooler. In some instances, positioning the blower to generate the proper airflow is a challenge.

SUMMARY

In one aspect, there is provided an aircraft engine assembly comprising: a turbo-compounded internal combustion engine having an engine shaft; a coolant cooler fluidly connected to a coolant circuitry of the internal combustion engine, the cooler having a cooler inlet in fluid communication with an environment of the engine assembly; a plenum in fluid communication with the environment via the coolant cooler and via an air outlet; and a fan disposed adjacent the air outlet and operable to drive an airflow from the environment into the plenum via the coolant cooler, the fan spaced apart from the internal combustion engine in a direction perpendicular to the engine shaft.

In another aspect, there is provided an aircraft engine assembly comprising an internal combustion engine having an engine coolant circuitry and an engine shaft; a coolant cooler fluidly connected to the engine coolant circuitry and to an environment of the engine assembly; a plenum in fluid communication with the environment via the coolant cooler and via an air outlet spaced from the coolant cooler; and a forced air system disposed adjacent the air outlet and operable to drive an airflow from the environment into the plenum via the coolant cooler, the forced air system located at a downstream end of the plenum relative to the airflow, the downstream end radially offset from a rotation axis of the engine shaft.

In a further aspect, there is provided a method of defining a cooling air circulation for an aircraft engine assembly including a liquid-cooled internal combustion engine having a rotatable engine shaft, the method comprising: fluidly connecting a plenum of the engine assembly to an environment around the engine assembly via a coolant cooler configured to cool a coolant of the internal combustion engine; fluidly connecting the plenum to the environment via an outlet spaced from the coolant cooler; and locating a fan adjacent the outlet at a location radially offset from a rotation axis of the rotatable engine shaft, the fan configured to drive an airflow from the environment into the plenum via the coolant cooler and from the plenum back to the environment via the outlet.

DESCRIPTION OF THE DRAWINGS

Reference is now made to the accompanying figures in which:

FIG. 4 is a schematic rear tridimensional view of the vehicle and engine assembly of FIG. 3 with part of the vehicle shown in transparency to show the engine assembly;

FIG. 5 is a schematic cross-sectional view of the vehicle and engine assembly of FIG. 4 taken along line 5-5; and FIG. 6 is a schematic cross-sectional view of a portion of FIG. 4 along line 6-6 on FIG. 4.

DETAILED DESCRIPTION

Figure 1:
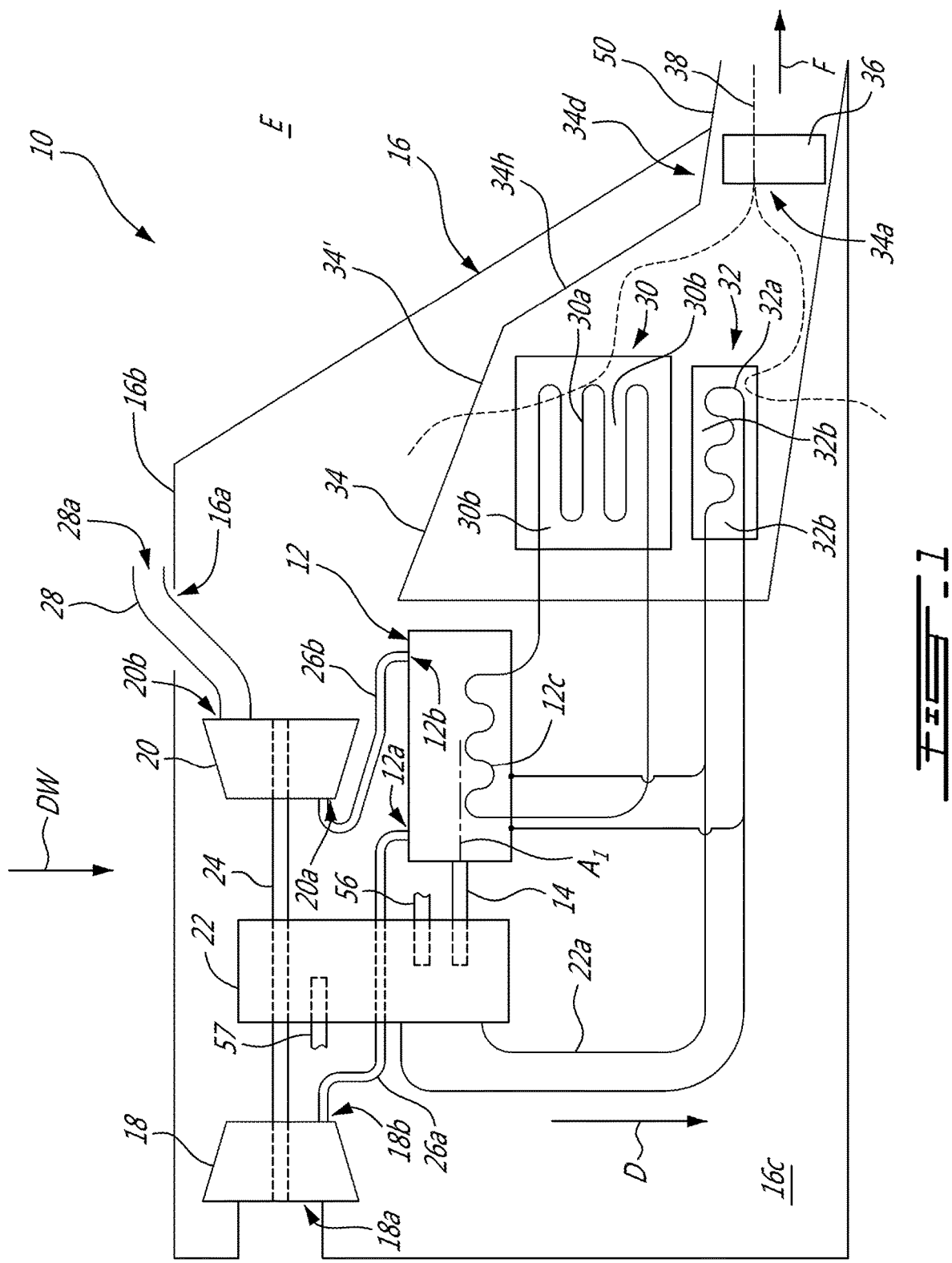
FIG. 1 is a schematic view of an engine assembly in accordance with a particular embodiment.
Figure 2:
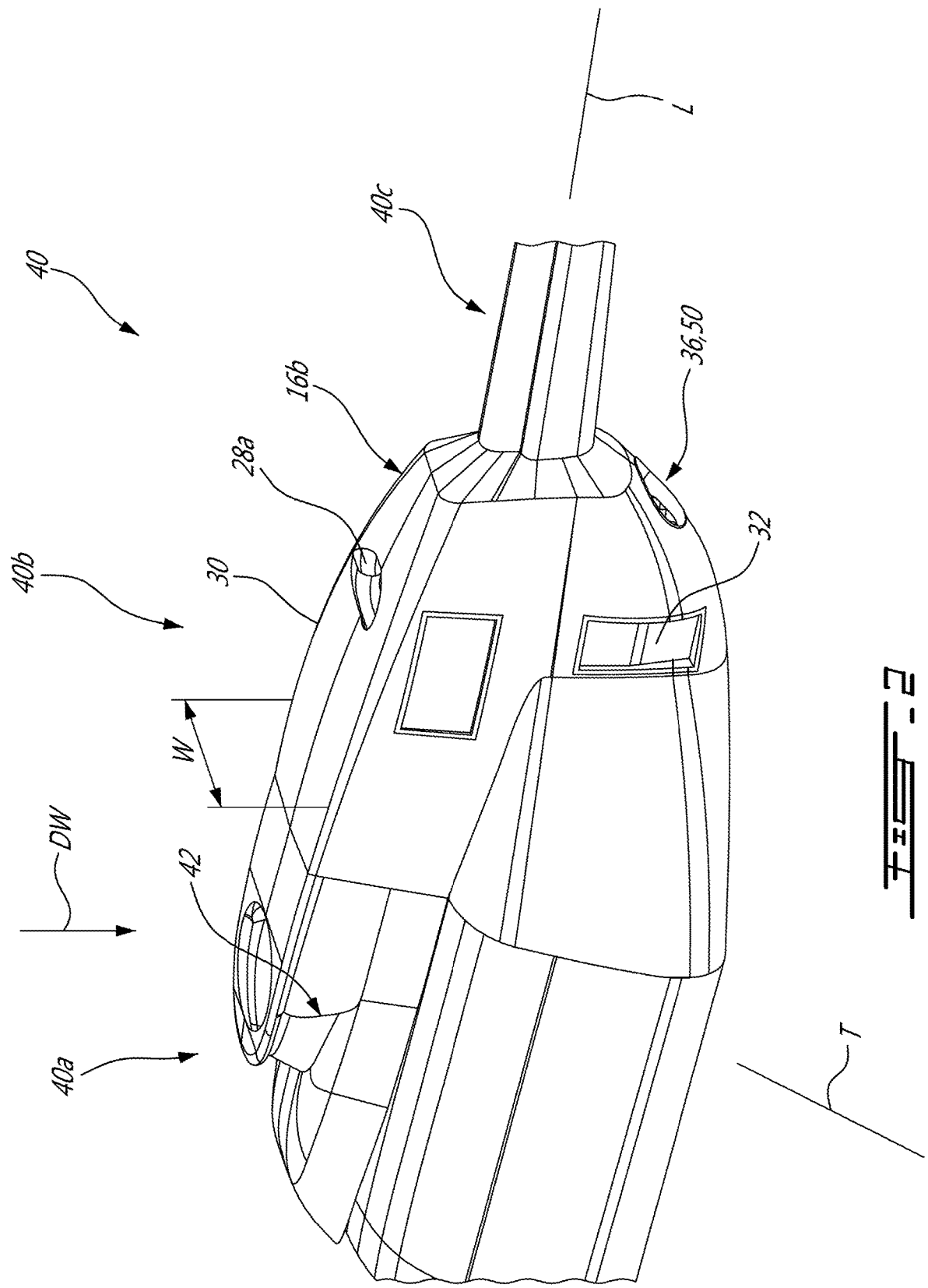
FIG. 2 is a schematic tridimensional view of a vehicle containing an engine assembly such as shown in FIG. 1, in accordance with a particular embodiment.

Referring to FIG. 1, an engine assembly 10 is generally shown and includes an internal combustion engine 12. In a particular embodiment, the internal combustion engine 12 is an intermittent internal combustion engine comprising one or more rotary units each configured for example as a Wankel engine, each engaged to and driving rotation of an engine shaft 14. In a particular embodiment, the internal combustion engine 12 is a rotary engine comprising three rotary units each configured as a Wankel engine, with a rotor cavity having a profile defining two lobes, preferably an epitrochoid, in which a rotor is received with the geometrical axis of the rotor being offset from and parallel to the axis of the rotor cavity, and with the rotor having three circumferentially-spaced apex portions and a generally triangular profile with outwardly arched sides, so as to define three rotating combustion chambers with variable volume. Other suitable configurations of engine may be used, as desired. For example, the internal combustion engine 12 may be any other suitable type of internal combustion engine, including any other suitable type of intermittent internal combustion engine (e.g., reciprocating pistons and cylinder, diesel, etc.).

In a particular embodiment, the engine assembly 10 includes a compound cycle engine system or compound cycle engine such as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein. The engine assembly 10 may be used as a prime mover engine, such as on an aircraft or other vehicle, or in any other suitable application. Any suitable engine type may be employed, however.

In the embodiment shown, the engine assembly 10 is received within an engine bay 16 of a vehicle. In the depicted embodiment, the internal combustion engine 12 is a turbo-compounded engine, and the engine assembly 10 further includes a compressor 18 and a turbine section 20. The engine assembly 10 includes an engine assembly inlet 18a in fluid communication with an environment E around the engine bay 16 (e.g. outside of the engine assembly 10), for example in fluid communication with atmosphere. The compressor 18 has an inlet in fluid communication with or corresponding to the engine assembly inlet 18a, and an outlet 18b in fluid communication with an air inlet 12a of the internal combustion engine 12 (corresponding to or communicating with inlet port(s) of rotary units/reciprocating pistons of the internal combustion engine 12). The compressor 18 compresses the air received from the engine assembly inlet 18a before it is fed to the air inlet 12a of the internal combustion engine 12, for example via a conduit 26a fluidly connecting the outlet 18b of the compressor 18 to the engine air inlet 12a.

The internal combustion engine 12 provides an exhaust flow of high pressure hot gas exiting at high peak velocity, in the form of exhaust pulses. In the illustrated embodiment, an exhaust 12b of the internal combustion engine 12 (corresponding to or communicating with exhaust port(s) of rotary units/reciprocating pistons of the internal combustion engine 12) is in fluid flow communication with an inlet 20a of the turbine section 20. The turbine section 20 expands the hot gas received from the internal combustion engine, for example via a conduit 26b fluidly connecting the exhaust 12b of the internal combustion engine 12 to the inlet 20a of the turbine section. The turbine section 20 may comprise a single turbine, or may include two or more turbine stages in serial fluid communication with each other; the two or more turbine stages may have the same, similar, or different reaction ratios from one another. For example, in a particular embodiment the turbine section 20 includes a first stage turbine receiving the exhaust from the internal combustion engine 12 and having a smaller reaction ratio than a second stage turbine receiving the exhaust from the first stage turbine. Other configurations are contemplated.

To expulse the exhaust gases out of the engine bay 16, an outlet 20b of the turbine section 20 is fluidly connected to the environment E via an exhaust duct 28. In the embodiment shown, the exhaust duct 28 extends through an aperture 16a defined through a top wall 16b of the engine bay 16. An outlet 28a of the exhaust duct 28 is fluidly connected to the environment E.

It is understood that the configuration of the engine assembly 10 is exemplary, and that variations are possible; for example, the compressor 18 and/or turbine section 20 may be omitted.

In the illustrated embodiment, the internal combustion engine 12, the compressor 18, and the turbine section 20 are in driving engagement with a gearbox 22. The gearbox 22 is configured to compound power provided by a turbine shaft 24 of the turbine section 20 and by the engine shaft 14, and to allow the turbine section 20 and/or the internal combustion engine 12 to drive the compressor 18.

In the illustrated embodiment, the rotors of the compressor 18 and of the turbine section 20 are engaged to the same turbine shaft 24, which is drivingly engaged to the engine shaft 14 via the gearbox 22; the turbine shaft 24 and the engine shaft 14 are parallel and radially offset from one another. Alternate configurations are possible, including, but not limited to, the rotor(s) of the compressor 18 being engaged to a shaft separate from the turbine shaft 24 (whether coaxial with the turbine shaft 24, with the engine shaft 14, or offset from both) and in driving engagement with the turbine shaft 24 and/or the engine shaft 14, for example via the gearbox 22 or via any other suitable type of engagement; and/or two or more of the shafts extending at an angle (perpendicularly or otherwise) to each other.

In the embodiment shown, the engine shaft 14 and the turbine shaft 24 are in driving engagement with one or more output shafts 56, 57 via the gearbox 22, so that the power provided by the engine shaft 14 and by the turbine shaft 24 is combined to drive the output shaft(s) 56, 57. A compounded power of the internal combustion engine 12 and of the turbine section 20 is accordingly used to drive the output shaft(s) 56, 57. Alternately, the engine assembly 10 may be configured to drive any other type of load including, but not limited to, one or more generator(s), propeller(s), accessory(ies), rotor mast(s), compressor(s), or any other appropriate type of load or combination thereof.

In the embodiment shown, the internal combustion engine 12 is liquid cooled and includes a coolant circuitry 12c formed by one or more conduits defined in a housing of the internal combustion engine 12 so as to circulate coolant within or adjacent hot zones of the internal combustion engine 12 to provide suitable cooling. The conduits are configured to be in heat exchange relationship with the hot zones such that the coolant circulating within the coolant circuitry 12c provides cooling by picking up heat from the hot zones.

Still referring to FIG. 1, the engine assembly 10 includes at least a first heat exchanger referred to herein as a coolant cooler 30. The coolant cooler 30 has one or more first conduit(s) 30a fluidly connected to the coolant circuitry 12c of the internal combustion engine 12. The coolant cooler 30 has one or more second conduit(s) 30b in heat exchange relationship with the first conduit(s) 30a.

In the embodiment shown, the engine assembly 10 further includes a lubricant circuitry 22a communicating with element(s) (e.g., bearings) of the gearbox 22 and/or engine assembly 10 (internal combustion engine 12, compressor 18, and/or turbine section 20) requiring lubrication, so as to circulate a suitable lubricant thereto. A second heat exchanger referred to herein as a lubricant cooler 32 has one or more first conduit(s) 32a fluidly connected to the lubricant circuitry 22a. The lubricant cooler 32 further has one or more second conduit(s) 32b in heat exchange relationship with the first conduit(s) 32a.

In the embodiment shown, air from the environment E is used to pick up heat from the coolant and the lubricant circulating within the coolant circuitry 12c and the lubricant circuitry 22a. The second conduits 30a, 32a of the coolers 30, 32 thus define inlets of the coolers 30, 32 which are in fluid communication with the environment E.

Still referring to FIG. 1, in the embodiment shown, the engine assembly 10 further includes a plenum 34 received within the engine bay 16 fluidly connected to the environment E. In the embodiment shown, the plenum 34 is received in the engine bay 16 and defines a portion of the engine bay 16 that is fluidly connected to the environment E; it is understood that alternately, the plenum 34 may be defined outside (e.g. separately from) the engine bay 16. The plenum 34 is in fluid flow communication with the environment E via the second conduits 30b, 32b of the coolers 30, 32, which define the inlets of the plenum 34. The plenum 34 is also in fluid flow communication with the environment E via an air outlet 34a spaced from the coolers 30, 32.

To generate an airflow F into and out of the plenum 34, the engine assembly 10 further includes a forced air system, which in the embodiment shown in defined by a fan 36, disposed adjacent the air outlet 34a. The fan 36 is operable to drive the airflow F from the environment E to the air outlet 34a of the plenum 34 via the second conduits 30b, 32b of the coolers 30, 32, and from the plenum 34 back to the environment E via the air outlet 34a. In the embodiment shown, the fan 36 is driven without being in driving engagement with the engine shaft 14 and/or the turbine shaft 24; the fan may be driven for example by an electric motor, which may receive power from a generator (not shown) driven by the engine shaft 14 and/or the turbine shaft 24, or which may be powered independently of the engine shaft 14 and turbine shaft 24. The fan 36 is configured to create a pressure drop in the plenum 34 such that an air pressure in the plenum 34 is less than an air pressure of the environment E. Air is therefore drawn in the plenum 34 via its inlets to compensate for this pressure drop. Stated otherwise, the fan 36 drives the airflow F along a flow path 38 that extends from the environment E to the air outlet 34a of the plenum 34 via the second conduits 30b, 32b of the coolers 30, 32, and from the plenum 34 back to the environment E via the air outlet 34a. It is understood that the term "fan" is intended to encompass any type of forced air system including a rotor for driving the airflow (e.g. blower), and that any other type of suitable forced air system may alternately be used.

It is understood that in another embodiment, the fan 36 may be used to drive the flow to the coolant cooler 30 only; the lubricant cooler 32 may be configured to receive air in any other suitable manner, and/or be disposed in any other suitable location within or outside of the engine assembly 10.

Referring now to FIGS. 2-5, a vehicle 40, which in the embodiment shown is a helicopter, includes the engine assembly 10 of FIG. 1, where one output shaft 57 is used to drive a main rotor (not shown) and another output shaft 56 is a tail rotor shaft used to drive a tail rotor (not shown). As can be best seen in FIG. 2, the helicopter 40 has a front section 40a, a rear section 40b, and a tail section 40c supporting the tail rotor. The rear section 40b is disposed between the front and tail sections 40a, 40c relative to a longitudinal axis L of the helicopter 40. As can be best seen in FIG. 3, the engine assembly 10 is located in the helicopter rear section 40b. In the illustrated embodiment, the helicopter 40 has inlet conduits 42, one on each sides of the helicopter 40, for supplying air to the internal combustion engine 12. The inlet conduits 42 thus define the engine assembly inlet 18a providing air to the compressor 18.

Figure 3:
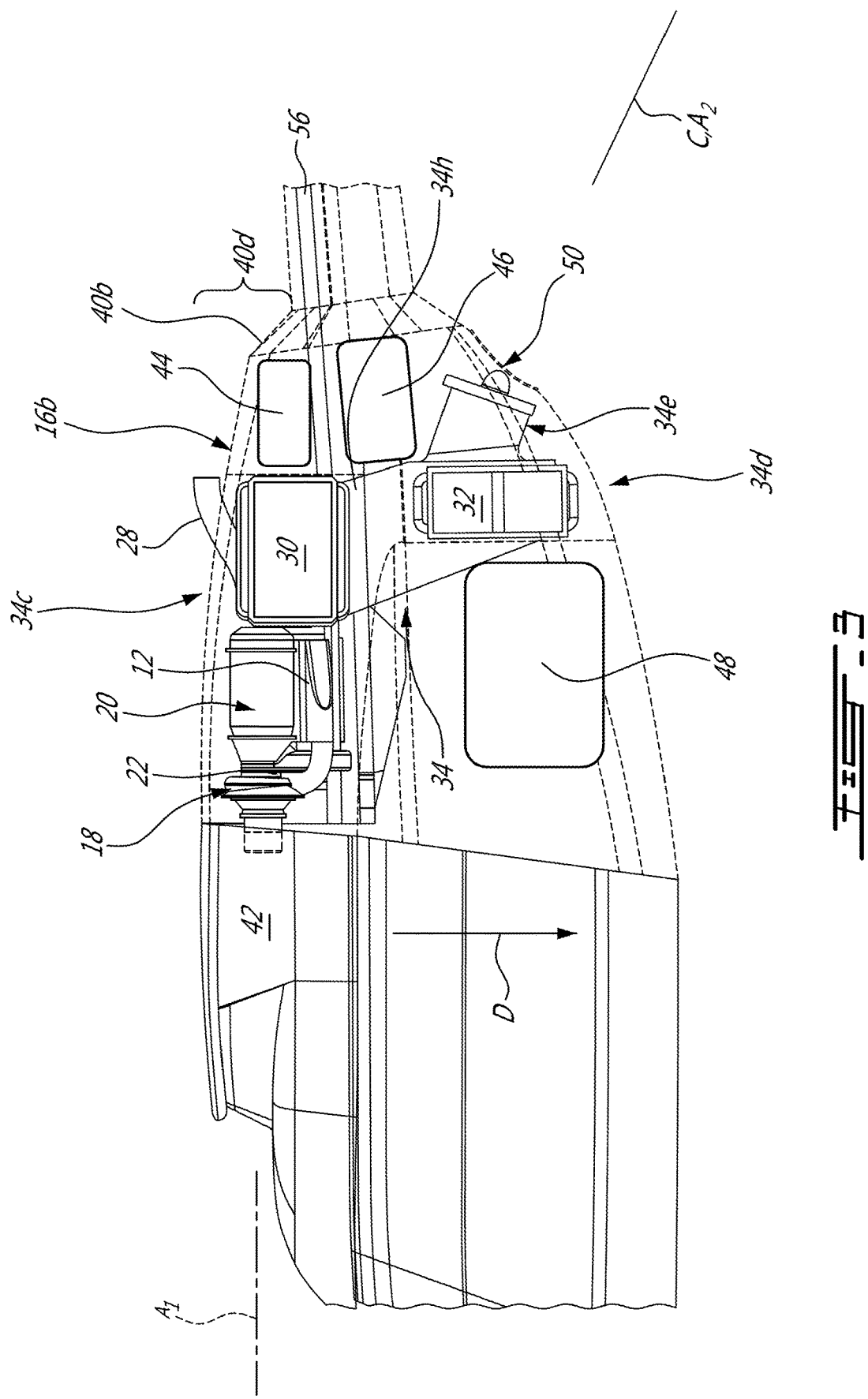
FIG. 3 is a schematic side view of an implementation of the engine assembly of FIG. 1 in accordance with a particular embodiment in the vehicle of FIG. 2, with part of the vehicle shown in transparency to show the engine assembly.

Still referring to FIG. 3, the helicopter 40 includes accessory compartments, for example for tail rotor components that are required for operation of the tail rotor. As shown, the helicopter 40 includes a first accessory compartment 44 containing for example an oil tank, oil pump and other helicopter accessories required for safe operation, and a second accessory compartment 46 containing for example hydraulics components for the tail rotor and/or main rotor (not shown) of the helicopter 40, or any other suitable component. The helicopter 40 further includes a cargo bay 48 for receiving, for instance, baggage of passengers of the helicopter 40. Therefore, the limited space within the engine bay 16 and the presence of the accessory compartments 44, 46 and of the cargo bay 48 combined with particular cross-sectional area requirements of the coolant and lubricant coolers 30, 32 (for example, about 600 square inches for the second conduit(s) 30b of the coolant cooler 30 and/or about 400 square inches for the second conduit(s) 32b of the lubricant cooler 32; other values are also possible) might limit the possible configurations of the plenum 34 and of the possible locations to eject air out of the plenum 34 and therefore the possible locations of the fan 36. One of the possible configurations is described herein below.

As illustrated, a top portion 40d of the rear section 40b contains the internal combustion engine 12, the compressor 18, the turbine section 20, and the exhaust duct 28. The accessory compartments 44, 46 are located in the rear section 40b behind the turbine section 18. Referring to FIG. 4, a top wall 34' of the upper end 34c of the plenum 34 is shaped such as to define an indentation 34f for receiving the exhaust duct 28. The top wall 34' of the plenum 34 is thus shaped to surround a portion of the exhaust duct 28, so that the exhaust duct 28 extends outside of the plenum 34. Other configurations are contemplated.

Referring back to FIG. 3, in the illustrated embodiment, the helicopter 40 defines an outlet 50 to eject air out of the plenum 34. The helicopter outlet 50 is located in the helicopter rear section 40b below the tail section 40c. In the embodiment shown, the plenum 34 is located between the cargo bay 48 and the accessory compartments 44, 46 along the helicopter longitudinal axis L. The plenum 34 extends vertically from an upper end 34c to a lower end 34d, the lower end 34d spaced apart from the upper end 34c in a direction D perpendicular to the engine shaft 14, i.e. corresponding to a radial direction with respect to the engine shaft 14. In a particular embodiment, direction D is vertical when the helicopter is on the ground. In the depicted embodiment, the rotation axis $A_1$ of the engine shaft 14 (see also FIG. 5) intersects and/or is aligned with the upper end 34c of the plenum 34.

The plenum air outlet 34a is fluidly connected to the helicopter outlet 50. In the embodiment shown, the plenum 34 includes a rear wall 34h, and a duct 34e extending rearwardly from the rear wall 34h at the lower end 34d. The duct 34e fluidly connects the interior of the plenum 34 to the helicopter air outlet 50. The fan 36 is located within the duct 34e. The duct 34e is cylindrical and has a central axis C that is coincident with a rotation axis $A_2$ of the fan 36. In the depicted embodiment, the rotation axis $A_2$ of the fan 36 and the rotation axis $A_1$ of the engine shaft 14 are non-parallel, and may be offset from one another (in a direction perpendicular to FIG. 3) so as to be non-intersecting. Other configurations are contemplated.

The fan 36 is located remotely from the internal combustion engine 12, compressor 18 and turbine 20, as well as from the exhaust duct 28. In the embodiment shown, the fan 36 is spaced apart from the internal combustion engine 12, compressor 18, turbine 20 and exhaust duct 28 in direction D. The fan 36 is located at the lower end 34d of the plenum 34, which may be defined as a downstream end relative to the airflow F along the flow path 38. The lower or downstream end 34d and the fan 36 are thus radially offset from the rotation axis $A_1$ of the engine shaft 14.

Referring now to FIG. 4, the coolant cooler 30 and the lubricant cooler 32 are offset from each other relative to the direction D; this may allow, for example, to accommodate limited spaced between the cargo bay 48 and the accessory compartments 44, 46. The engine assembly 10 further includes a second coolant cooler 30 fluidly connected to the coolant circuitry 12c and to the environment E, as described above. The engine assembly 10 further includes a second lubricant cooler 32 fluidly connected to the lubricant circuitry 22a and to the environment E, as described above. The helicopter 40 thus includes one coolant cooler 30 and one lubricant cooler 32 on each side.

In the depicted embodiment, the plenum 34 defines a symmetry plane (illustrated by line 5-5) containing the central axis C of the plenum duct 34e and outlet 50. The coolant coolers 30 are disposed on opposite sides of the symmetry plane P and, in the disclosed embodiment, are located at a same height relative to the direction D. The lubricant coolers 32 are disposed on opposite sides of the symmetry plane P and, in the disclosed embodiment, are located at a same height relative to the direction D. Other configurations are contemplated.

Referring now to FIGS. 4 and 6, each of the coolers 30, 32 is covered by a panel 58' defining a plurality of louvers 58, through which the fluid communication between the second conduits 30b, 32b and the environment E is defined. The louvers 58 guide air into the second conduits 30b, 32b. More specifically, the rotation of a main rotor of the helicopter generates a downwardly directed airflow, referred to herein as downwash DW (FIG. 6). Therefore, the louvers 58 are configured and oriented so as to receive and direct the downwash into the second conduits 30b, 32b. The downwash DW pushes air through the second conduits 30b, 32b and in the plenum 34, supplementing the drawing force provided by the fan 36 expelling air out of the plenum 34. Stated otherwise, the downwash DW is used to push air through the coolers 30, 32. In a particular embodiment, using the downwash to push air through the coolers 30, 32 allows for the fan to be smaller than in a configuration where features are not provided to direct the downwash into the coolers, which might allow weight savings.

Referring particularly to FIG. 6, the louvers 58 define conduits 58a for redirecting a portion of the downwash DW along a direction of the second conduits 30b, 32b of the coolers 30, 32. As shown, each of the louvers 58 defines a conduit 58a that changes a direction of the flow from a direction parallel to the downwash DW when the flow enters the conduits 58a via inlets $58a_1$ of the conduits 58a to a direction of the second conduits 30b, 32b of the coolers 30, 32, for example to a direction transverse or perpendicular to the downwash DW, when the flow exits the conduits 58 via outlets $58a_2$ of the conduits 58a.

Referring now to FIGS. 4-5, the tail rotor shaft 56 is engaged to the internal combustion engine 12 and the turbine section 20 via the gearbox 22 and extends from the gearbox 22 to the tail section 40c of the helicopter 40 in parallel with the helicopter longitudinal axis L. In the embodiment shown, the tail rotor shaft 56 extends through the plenum 34. Referring to FIG. 5, in the depicted embodiment, the tail rotor shaft 56 extends in apertures 34g defined through the front and rear walls of the plenum 34. In a particular embodiment, sealed bearings (not shown) are provided at the apertures 34g and engage the tail rotor shaft 56 for limiting leaks. In a particular embodiment, the tail rotor shaft 56 is located between at least part of the engine assembly 10 and the fan 36. In the embodiment shown, the tail rotor shaft 56 is located between the fan 30 and the turbine section 20, between the fan 30 and the compressor 18, and between the fan 36 and at least part of the internal combustion engine 12; in other words, when the tail rotor shaft 56 extends horizontally, the fan 30 is located below the tail rotor shaft 56, and the compressor 18, turbine section 20 and at least part of the internal combustion engine 12 are located above the tail rotor shaft 56. Other configurations are also possible.

For a bigger vehicle, more than one engine assembly 10 might be used, each configured for example as set forth in FIG. 1 for redundancy purposes. Hence, each of the engine assemblies 10 (including fan, heat exchangers, plenum, etc.) is independent from the other of the engine assemblies 10.

In use and referring for example to FIG. 1, the flow F of air is drawn from the environment E into the plenum 34. The coolant of the internal combustion engine 12 of the engine assembly 10 is cooled by transferring heat from the coolant to the flow F of air entering the plenum 34. The air drawn in the plenum 34 and heated by the coolant is expelled back to the environment E with the fan 36 disposed at a location spaced apart from the internal combustion engine 12 in the direction D perpendicular to the rotation axis $A_1$ of the engine shaft 14.

In the embodiment shown, the flow F is guided along the plenum 34 and away from the internal combustion engine 12 toward the fan 36. A lubricant of the engine assembly is further cooled by transferring its heat to the flow F of air entering the plenum 34.

Referring to FIGS. 1 and 6, a portion of the exterior flow, or downwash DW, of the environment E is redirected from being oriented substantially parallel to the direction of the downwash DW to a direction of the second conduits 30b, 32b of the coolers 30, 32, for example transverse or perpendicular to the downwash DW.

Referring to FIG. 1, the cooling air circulation for the engine assembly 10 is defined by fluidly connecting the plenum 34 to the environment E via the coolant cooler 30. The plenum 34 is also fluidly connected to the environment E via the outlet 34a spaced from the coolant cooler 30. The fan 36 is provided at a position radially offset from the rotation axis $A_1$ of the engine shaft 14. The fan 36 is configured to drive the air flow F from the environment E into the plenum 34 via the coolant cooler 30 and from the plenum 34 back to the environment E via the outlet 34a.

In the embodiment shown, the plenum 34 is further fluidly connected to the environment E via the lubricant cooler 32. In the depicted embodiment, the plenum 34 is also fluidly connected to the environment E via the second coolant cooler 30 and second lubricant cooler 32. In the embodiment shown, the plenum 34 is fluidly connected to the environment E via conduits 58a of louvers 58 disposed upstream of the coolant cooler 30 relative to the airflow F, and the louvers 58 change a direction of the airflow F before it enters the coolant cooler 30.

In a particular embodiment, the configuration of the engine assembly 10 allows for locating the plenum 34 in the engine assembly 10 in spite of the accessory compartments 44, 46 and of the cargo bay 48 that take a considerable portion of the available space within or adjacent the engine bay 16. In a particular embodiment, efficiency of the coolers 30, 32 is improved by taking advantage of the downwash DW generated by the main rotor of the helicopter 40; use of the downwash DW to push air through the coolers 30, 32 and into the plenum 34 allows for the use of a smaller fan.

In a particular embodiment, by drawing air in the plenum 34 via the coolers 30, 32 with the fan 36, a boundary layer located in a vicinity of the coolers 30, 32 might be reactivated by the fan 36. This might offer a plurality of advantages from an aerodynamic perspective. For instance, a total drag of a vehicle containing the engine assembly 10 might be reduced, and an efficiency of the coolers might be increased, compared to another configuration that does not pull air in a plenum.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An aircraft engine assembly comprising:
a turbo-compounded internal combustion engine having an engine shaft having a rotation axis;
a coolant cooler fluidly connected to a coolant circuitry of the internal combustion engine, the cooler having a cooler inlet in fluid communication with an environment of the engine assembly;
a plenum in fluid communication with the environment via the coolant cooler and via an air outlet, the plenum extending from an upper end to a lower end spaced apart from the upper end along a direction perpendicular to the engine shaft, the rotation axis aligned with the upper end of the plenum; and
a fan disposed adjacent the air outlet and located at the lower end of the plenum, the fan operable to drive an airflow from the environment into the plenum via the coolant cooler, the fan spaced apart from the internal combustion engine in the direction perpendicular to the engine shaft.

2. The engine assembly of claim 1, further comprising a compressor in fluid communication with an inlet of the internal combustion engine, and a turbine having a turbine inlet in fluid communication with an exhaust of the internal combustion engine and a turbine shaft configured to compound power with the engine shaft.

3. The engine assembly of claim 2, further comprising an exhaust duct fluidly connecting an exhaust of the turbine to the environment, the fan spaced from the exhaust duct in the direction perpendicular to the engine shaft.

4. The engine assembly of claim 1, wherein the internal combustion engine is a rotary engine.

5. The engine assembly of claim 1, further including a lubricant circuitry for circulation of a lubricant to the engine assembly, and a lubricant cooler fluidly connected to the lubricant circuitry for circulation of the lubricant and in fluid communication with the environment for cooling of the lubricant, the plenum in fluid communication with the environment via the lubricant cooler, the fan operable to drive the airflow from the environment into the plenum via the coolant cooler and the lubricant cooler.

6. The engine assembly of claim 1, further including a tail rotor shaft in driving engagement with the engine shaft via a gearbox of the engine assembly, the tail rotor shaft extending within the plenum and in apertures defined through walls of the plenum.

7. The engine assembly of claim 6, wherein the tail rotor shaft is located between at least part of the internal combustion engine and the fan.

8. The engine assembly of claim 6, further comprising a compressor in fluid communication with an inlet of the internal combustion engine, and a turbine having a turbine inlet in fluid communication with an exhaust of the internal combustion engine and a turbine shaft configured to compound power with the engine shaft, the tail rotor shaft being horizontal, and wherein the compressor, the turbine and at least part of the internal combustion engine are located above the tail rotor shaft, and the fan is located below the tail rotor shaft.

9. The engine assembly of claim 1, further including a panel defining louvers covering the coolant cooler, the coolant cooler in fluid communication with the environment via the louvers, the louvers oriented to receive and change a direction of a downwardly directed flow before entry into the coolant cooler.

10. An aircraft engine assembly comprising: an internal combustion engine having an engine coolant circuitry and an engine shaft; a coolant cooler fluidly connected to the engine coolant circuitry and to an environment of the engine assembly; a plenum in fluid communication with the environment via the coolant cooler and via an air outlet spaced from the coolant cooler, the plenum extending at least partially in a direction perpendicular to the engine shaft; a forced air system disposed adjacent the air outlet and operable to drive an airflow from the environment into the plenum via the coolant cooler, the forced air system located at a downstream end of the plenum relative to the airflow, the downstream end radially offset from a rotation axis of the engine shaft; and a panel defining louvers covering the coolant cooler, the coolant cooler in fluid communication with the environment via the louvers, the louvers oriented to receive and change a direction of a downwardly directed flow before entry into the coolant cooler.

11. The engine assembly of claim 10, wherein the forced air system includes a fan.

12. The engine assembly of claim 10, wherein the internal combustion engine is a rotary engine.

13. The engine assembly of claim 10, wherein the plenum extends from an upper end to the downstream end spaced apart from the upper end along the direction perpendicular to the engine shaft, the rotation axis of the engine shaft aligned with the upper end of the plenum.

14. The engine assembly of claim 10, further including a lubricant circuitry for circulation of a lubricant to the engine assembly, and a lubricant cooler in fluid communication with to the lubricant circuitry for circulation of the lubricant and in fluid communication with the environment for cooling of the lubricant, the plenum in fluid communication with the environment via the lubricant cooler, the forced air system operable to drive the airflow from the environment into the plenum via the coolant cooler and the lubricant cooler.

15. The engine assembly of claim 10, further including a tail rotor shaft in driving engagement with the engine shaft, the tail rotor shaft extending within the plenum and in apertures defined through walls of the plenum.

16. The engine assembly of claim 15, wherein the tail rotor shaft is located between at least part of the internal combustion engine and the fan.

17. A method of defining a cooling air circulation for an aircraft engine assembly including a liquid-cooled internal combustion engine having a rotatable engine shaft, the method comprising:
fluidly connecting a plenum of the engine assembly to an environment around the engine assembly via a coolant cooler configured to cool a coolant of the internal combustion engine and changing a direction of a downwardly directed flow adjacent the coolant cooler before entry into the coolant cooler with louvers covering the coolant cooler, the coolant cooler in fluid communication with the environment via the louvers;
fluidly connecting the plenum to the environment via an outlet spaced from the coolant cooler and radially offset from the coolant cooler relative to a rotation axis of the rotatable engine shaft; and
locating a fan adjacent the outlet at a location radially offset from the rotation axis of the rotatable engine shaft, the fan configured to drive an airflow from the environment into the plenum via the coolant cooler and from the plenum back to the environment via the outlet.

18. The method of claim 17, further comprising fluidly connecting the plenum to the environment via a lubricant cooler configured to cool a lubricant of the engine assembly.

19. The method of claim 17, wherein locating the fan includes positioning the fan so that an output shaft driven by the rotatable engine shaft extends between the fan and at least part of the internal combustion engine.

* * * * *